(12) United States Patent
Wurmfeld et al.

(10) Patent No.: US 10,427,892 B1
(45) Date of Patent: Oct. 1, 2019

(54) MECHANISM FOR SUPPLYING MOSAIC TILE TO AN AUTOMATED TILE SETTER

(71) Applicant: Capital One Services, LLC, McLean, VA (US)

(72) Inventors: David Wurmfeld, Falls Church, VA (US); Kevin Osborn, Newton Highlands, MA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/290,436

(22) Filed: Mar. 1, 2019

(51) Int. Cl.
*B65G 47/90* (2006.01)
*E04F 13/08* (2006.01)

(52) U.S. Cl.
CPC .......... *B65G 47/90* (2013.01); *E04F 13/0871* (2013.01); *B65G 2201/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,921,508 A | * | 1/1960 | Schneider | B65H 33/14 271/136 |
| 4,091,945 A | * | 5/1978 | Patterson | E04F 21/1888 206/322 |
| 5,568,391 A | | 10/1996 | Mckee | |
| 5,697,520 A | * | 12/1997 | Gerber | B44B 9/00 221/105 |
| 10,055,868 B2 | | 8/2018 | Wolberg et al. | |
| 2005/0217192 A1 | * | 10/2005 | Boosy | B44C 1/28 52/311.1 |
| 2014/0267390 A1 | * | 9/2014 | Padwick | G06T 11/00 345/629 |

OTHER PUBLICATIONS

Oral et al., "Computer-assisted robotic tiling of mosaics", *Robotica* (2004) vol. 22, pp. 235-239.
Kaya et al., "Robot assisted tiling of glass mosaics with image processing",Industrial *Robot: An International Journal*, vol. 32 Issue 5, pp. 388-392, https://doi.org/10.11080/01439910510614655.

* cited by examiner

*Primary Examiner* — Kyle O Logan
(74) *Attorney, Agent, or Firm* — Finnegan, Henderson, Farabow, Garrett & Dunner LLP

(57) ABSTRACT

A method of supplying mosaic tile to an automated mosaic tile setter includes automatically loading a variety of mosaic tiles selected from mosaic tiles of at least two different colors, textures, patterns, or other visual or tactile characteristics into a plurality of hoppers. The automatic loading includes controlling a first pick-and-place robot to pick each of the mosaic tiles from a source of the mosaic tiles and place each respective mosaic tile into a respective one of the plurality of hoppers based on one of a last-in, first-out basis, or a last-in, last-out basis, and a desired pattern of a mosaic tile arrangement for installation at a work site. Each respective one of the loaded mosaic tiles is picked from a hopper using a second pick-and-place robot and placed onto one of a plurality of sheets of underlayment material.

20 Claims, 3 Drawing Sheets

MECHANISM FOR SUPPLYING MOSAIC TILE TO AN AUTOMATED TILE SETTER

TECHNICAL FIELD

The disclosed embodiments generally relate to tile setting and, more particularly, a method and apparatus for supplying mosaic tile to an automated tile setter.

BACKGROUND

Mosaic is the art of decoration with small pieces of glass, ceramic, stone, wood, plastic, coconut shells or other material, having one or more colors and placed on a surface in an arrangement such as a design, an image, a pattern, an abstract image, or any other tile combination. Mosaic may be used as decorative art, whether as part of an interior or an exterior decoration of a building or as a cultural or spiritual object, such as in cathedrals.

Generating a mosaic involves two stages, which may be performed together, but are usually performed separately. First, the mosaic maker has to decide on the color and placement of the different tiles in the mosaic, in order to create the desired effect of the image, the pattern or the arrangement of the tiles. This stage is traditionally performed by using tools such as paper, pens, and computer-aided drawing tools. These traditional methods generally require a high level of artistry on the part of the mosaic maker. Additionally, the resulting design is not presented in a particularly realistic manner to a user, due to the differences in color or pattern between the tiles as simulated by a computer or other drawing tools and the actual tiles used when creating a mosaic tile arrangement. When using a computerized tool, it may not be possible for the user to make slight changes to the resulting design, since changing the original picture and repeating the design generation process will not necessarily yield the expected result. The construction of a mosaic tile arrangement should also support dividing the resulting arrangement into a number of pages, or sections. Each section that is created should be of predetermined maximum dimensions. The maximum dimensions for each section are at least in part derived from the equipment used for the second stage, during which mosaic tiles are selected and placed on each section and the sections are marked, packaged, and shipped to the place where the sections are attached to an ultimate destination, such as a wall, a floor, or another area to be decorated. Dividing the arrangement into the proper number and sized sections is further challenging if the tiles are not arranged in a grid.

The second stage is the tile placement stage, in which the tiles are placed on a surface according to the design. In some situations, the surface on which the tiles are placed may be the final destination of the mosaic. Alternatively, the surface on which the tiles are placed is a temporary surface. The temporary surface may be a section of a sheet of material or a substrate that may include an adhesive applied to the surface. The sheet of material may be a flexible fabric mesh or any other substrate or underlayment material that enables sections of the mosaic tile arrangement made up of multiple tiles arranged in a pattern to be transported to a destination and installed in a designated location. This step is labor-intensive and error-prone if carried out manually.

There is thus a need for a method and apparatus for efficiently receiving a digitized image, determining a desired arrangement of mosaic tiles depicting the digitized image, and implementing automated loading and placement of the mosaic tiles that will recreate the image in the form of a mosaic tile arrangement.

The present disclosure is directed to addressing one or more of the problems set forth above and/or other problems associated with automated mosaic tile setting.

SUMMARY

In one aspect, the present disclosure is directed to a method of supplying mosaic tile to an automated mosaic tile setter. The method may include automatically loading a variety of mosaic tiles selected from mosaic tiles of at least two different colors, textures, patterns, or other visual or tactile characteristics into a plurality of hoppers or bins. The automatic loading may include controlling a first pick-and-place robot to pick each of the mosaic tiles from a source of the mosaic tiles and place each respective mosaic tile into a respective one of the plurality of hoppers. The automatic loading may be based on one of a last-in, first-out basis, or a last-in, last-out basis, and a desired pattern of a mosaic tile arrangement for installation at a work site. The method may also include picking each respective one of the loaded mosaic tiles from each of the plurality of hoppers using a second pick-and-place robot and placing each respective one of the mosaic tiles picked by the second pick-and-place robot onto one of a plurality of sheets of underlayment material in a tessellated arrangement. Each of the plurality of sheets may be configured to support and hold the respective mosaic tiles in respective positions relative to each other for transport to the work site and installation to form the mosaic tile arrangement.

In another aspect, the present disclosure is directed to a system for supplying mosaic tile to an automated mosaic tile setter. The system may include a first pick-and-place robot configured for loading a variety of mosaic tiles selected from mosaic tiles of at least two different colors, textures, patterns, or other visual or tactile characteristics into a plurality of hoppers. The system may also include a first controller operatively connected to the first pick-and-place robot and programmed to control the first pick-and-place robot to automatically load the mosaic tiles into each of the plurality of hoppers on one of a last-in, first-out basis, or a last-in, last-out basis, and synchronize the automatic loading of the mosaic tiles into the plurality of hoppers with an optimized ordering of the tiles loaded into each respective hopper that is based on a desired pattern of a mosaic tile arrangement to be installed at a work site. The system may still further include a second pick-and-place robot configured to pick and place each respective one of the loaded mosaic tiles from a respective one of the plurality of hoppers, and a second controller operatively connected to the second pick-and-place robot and programmed to control the second pick-and-place robot to pick each respective one of the mosaic tiles from a respective one of the plurality of hoppers, and place each respective one of the mosaic tiles onto a respective one of a plurality of sheets of underlayment material in an arrangement on each respective sheet of underlayment material that forms a section of the mosaic tile arrangement to be installed at the work site.

In yet another aspect, the present disclosure is directed to a method of supplying mosaic tile to an automated mosaic tile setter. The method may include automatically loading a variety of mosaic tiles selected from mosaic tiles of at least two different colors, textures, patterns, or other visual or tactile characteristics into a plurality of hoppers. The automatic loading may include controlling a first pick-and-place robot to pick each of the mosaic tiles from a source of the mosaic tiles and place each respective mosaic tile into a respective one of the plurality of hoppers. The automatic loading may be based on one of a last-in, first-out basis, or a last-in, last-out basis, and a desired pattern of a mosaic tile arrangement for installation at a work site. The method may further include picking each respective one of the loaded mosaic tiles from each of the plurality of hoppers using a second pick-and-place robot, computer-numerically-controlled (CNC) machining one or more of the respective mosaic tiles picked from a respective one of the hoppers based on the desired pattern of the mosaic tile arrangement before placing the respective mosaic tiles on one of a plurality of sheets of underlayment material, and placing each respective one of the mosaic tiles picked by the second pick-and-place robot onto one of the plurality of sheets of underlayment material in a tessellated arrangement, wherein each of the plurality of sheets is configured to support and hold the respective mosaic tiles in respective positions relative to each other for transport to the work site and installation to form the mosaic tile arrangement.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

The method and apparatus according to the present disclosure address the disadvantages of the prior art by enabling the efficient generation of a mosaic tile arrangement from a given image or design. An automated tile setting system according to various embodiments of this disclosure may include a plurality of hoppers loaded with optimized orderings of individual tiles that will be automatically picked from the hoppers and placed on sheets of underlayment material to form sections of a mosaic tile arrangement. The hoppers may be automatically loaded and configured to be mounted in specific positions relative to an automated tile setting system according to various embodiments of this disclosure. The automated loading of the tiles into the hoppers includes loading the tiles in an optimized ordering based on the ultimate location of each of the tiles in a mosaic tile arrangement recreating an image and efficient movements of a pick-and-place robot configured to transfer each of the tiles from the respective hoppers to their respective locations on each section of underlayment material. The optimized loading of the tiles into the hoppers enables efficient placement of the tiles onto sections of underlayment material to be transported and installed with the tiles at a work site when forming the mosaic tile arrangement.

Figure 1:
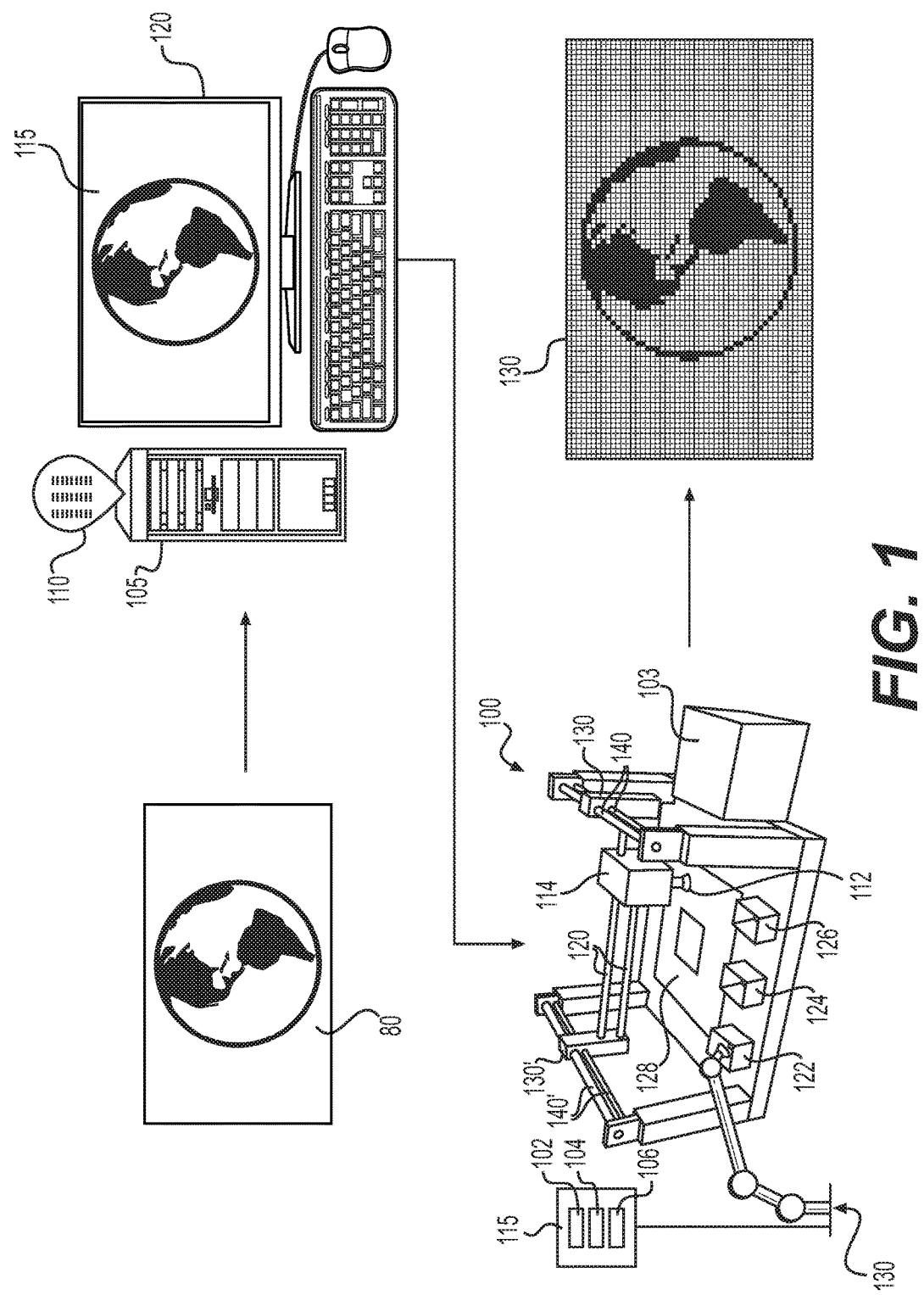
FIG. 1 is a schematic illustration of an exemplary automated mosaic tile setting system.
Figure 2:
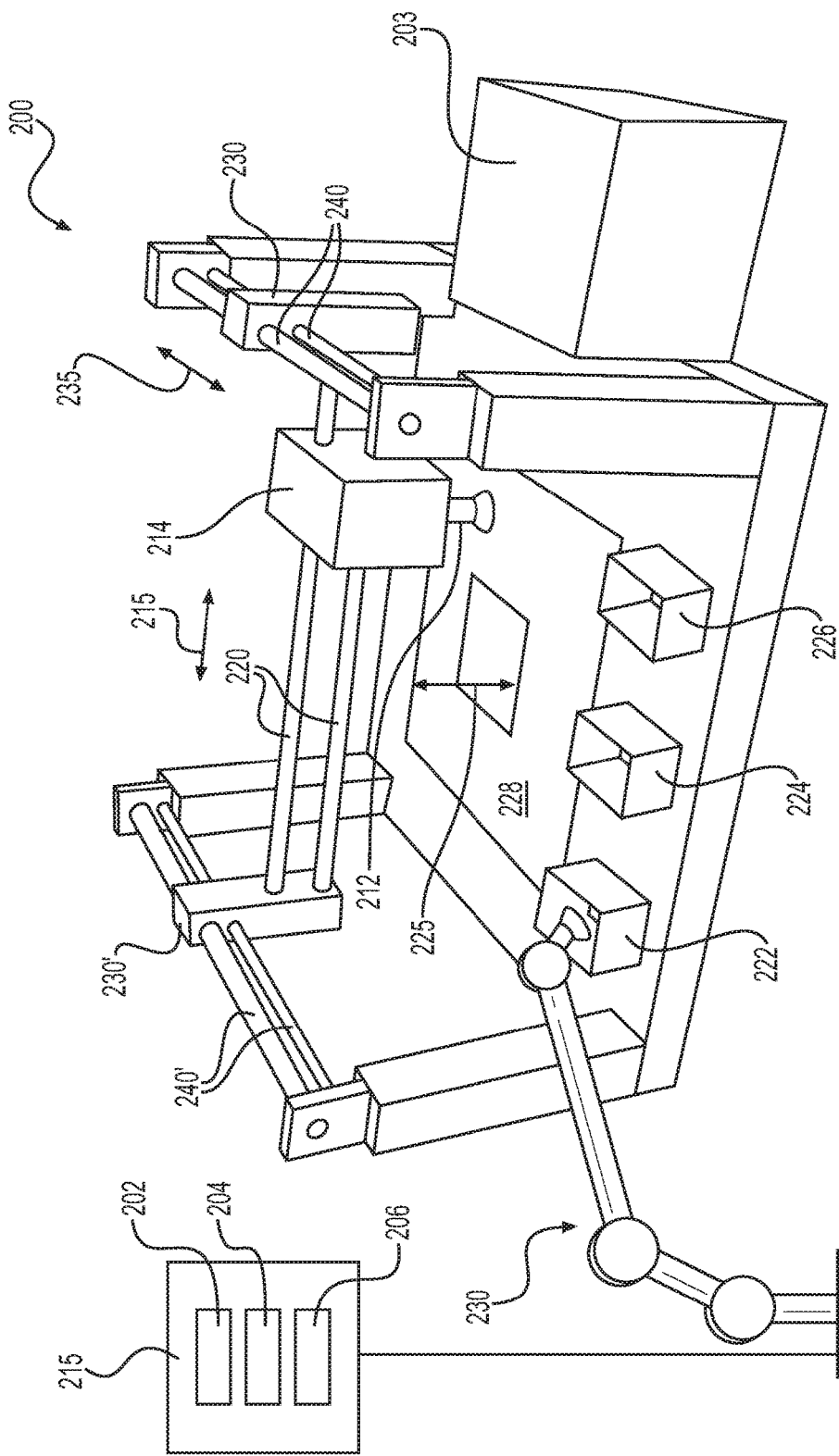
FIG. 2 is a schematic illustration of an embodiment of the automated mosaic tile setter of FIG. 1.
Figure 3:
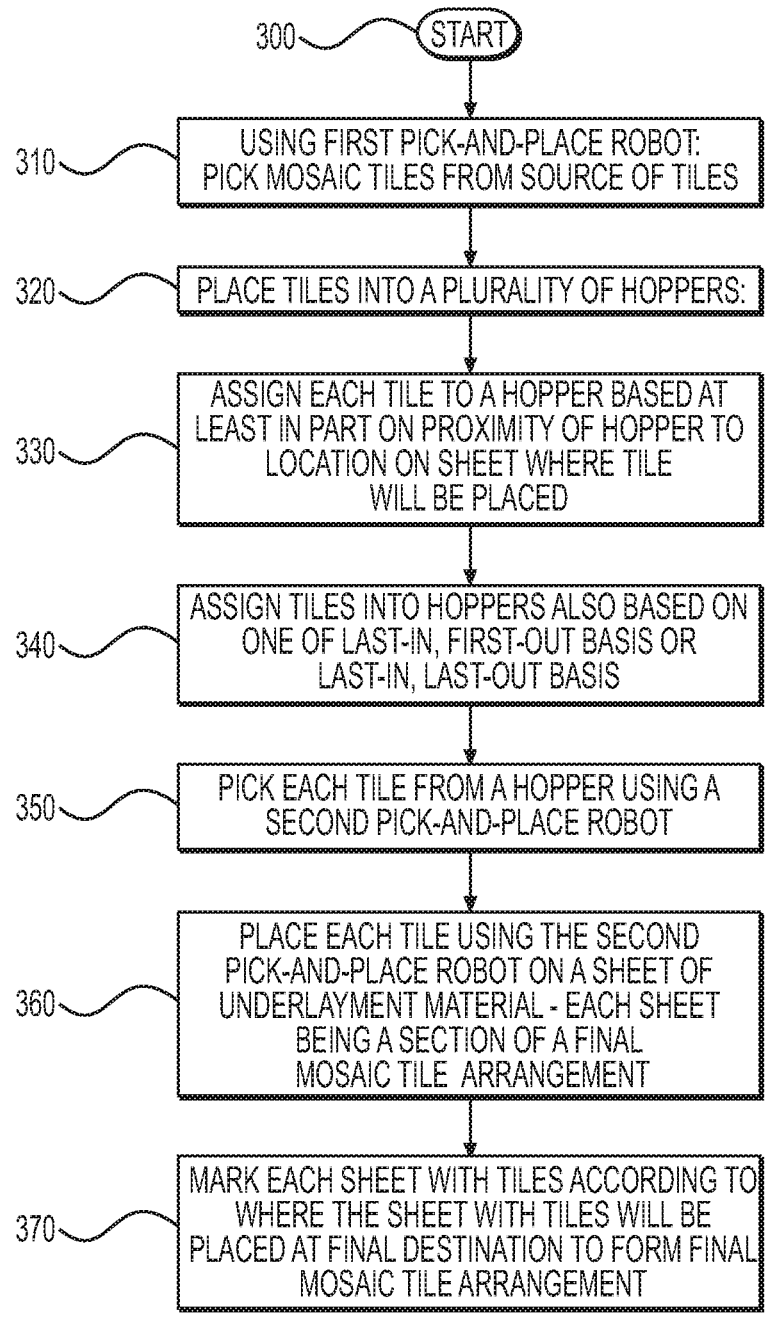
FIG. 3 is a flowchart showing a method consistent with an embodiment of this disclosure.

The apparatus and method as shown in the exemplary embodiments of FIGS. 1-3 include converting an image or picture 80 into a computerized file such as an image file using one or more image conversion applications 110 executed by one or more processors in a controller 105. The conversion process may include a scanner to convert an analog image into a digital electronic format, or an image may be available in an electronic format. Once image 80 is available in an electronic format, the image may be presented to a user on a computerized display device 115. The user is then given the option to use an input device, such as a pointing device, to make desired changes to the image, such as by marking lines on the image, for example, lines which enhance the outlines of features appearing in the image, or any other desired lines. The lines can include one or more straight or curved line segments.

With advancements in scanning technology, the ability to take an image and transpose it into digital form for use in a computer is readily available. The availability of such scanning technology presents many options for decorating interiors and exteriors of an environment. In addition, surfaces on commonly found items, such as plazas, walkways, pool areas, coffee tables, dining tables, counter tops, mantle pieces and wall hangings, could all be decorated in tile using the data representing the design which is to be represented by the tile pieces. In digital form, a desired design could be projected electronically in a simulation of an environment in which it is to be used. That is, data representing a graphic in digitized form could be displayed on a screen or printed by a multicolored laser jet printer on paper in the case where a hard copy is desired. However, while it is possible to create and maintain such graphic representations of a given design electronically in a computer, implementing this data to drive digitally controlled machinery to create a simulated mosaic involves correlating the rules of tiling mathematics with the control logic of the implementing machines.

Additionally, the capability of computers to store and execute complex equations and matrices, such as equations involving the laws of tessellism or pointillism that govern tiling pattern design, is made virtually automatic through the use of such technology. The placement of the basic geometric shapes often used in creating a mosaic, such as squares, hexagons or triangles can be integrated with one another by using appropriate software. Various exemplary embodiments of the present disclosure may include executing applications to generate control commands for controlling one or more pick-and-place robots adapted to arrange tiles in the shapes of equilateral triangles, squares, regular hexagons, and other polygonal shapes in a myriad of different formations by execution of appropriate algorithms in controller 105. The laying out of individual tiles to physically determine whether or not they fit within a given confine, as is presently done by hand, can further be simplified by an overall algorithm for automatically creating a mosaic tile arrangement by executing various computerized commands.

The computerized capabilities according to various embodiments of this disclosure may also enable the creation of a franchised business model in which individual franchisees or business owners can provide sophisticated and creative mosaic tile installation services without requiring the extensive training, experience, and artistic ability traditionally required for installing mosaic tiles. In one possible mosaic tile-laying franchise business model, a franchisor company or organization supporting the franchisees may provide an entire library of digitized images suitable for replication as mosaic tile arrangements, provide customized design variations and other design services, and supply hoppers or cassettes filled with ordered stacks of mosaic tiles with different characteristic colors, textures, shapes, and sizes to be installed onto sections of underlayment of predetermined dimensions which, when placed in the proper arrangement on a desired end surface, reproduce the desired mosaic tile image. The franchisor may also provide detailed instructions for an installer having the necessary automated tile setting equipment such that no special skills are required to produce the sections of underlayment with installed tiles and place the sections in the proper positions at a job site. The franchisor may provide replacement stacks or hoppers of tile when required for fixing errors or producing additional sections of a mosaic tile arrangement, and other billing and cost estimating services to assist the franchisees with their business interactions with customers.

In one implementation of a mosaic tile installation method according to this disclosure, a mosaic description may be generated from an image selected or designed by a customer, wherein lines marked by the customer on the image in order to emphasize or highlight certain features are covered by tiles adjacent to each other essentially along a full side of the tile, even when the line is not horizontal or vertical. Optionally, one or more lines of tiles may also be arranged on any one or both sides of the marked lines. The tiles covering the rest of the image may be arranged in essentially straight lines, while taking into consideration the marked lines and their surroundings. The colors of the mosaic may be selected to match as realistically as possible the colors of the image with the colors of the tiles available to the construction of the actual mosaic. The mosaic description is then presented to the customer. For a more realistic view, the presented tiles are not computer-generated shapes, but rather images of actual tiles, captured for example by scanning actual tiles into the computer and presenting the scanned images as a completed mosaic tile arrangement.

The customer may have the option to graphically or textually edit the presented mosaic tile arrangement, by changing a tile to a tile of another color, moving, deleting, adding, rotating, or otherwise changing one or more tiles. Another offered feature may include rotating a group of tiles that may be automatically laid on one or more sections of underlayment in a repetitive pattern created by one or more macros of control commands implemented by one or more pick-and-place robots used during creation of the sections of a mosaic tile arrangement. When using this option, the user may mark a group of tiles, and each tile may be rotated along its middle. The rotation angle can be the same for all tiles in the group, or in a gradually changing angle (gradient), for purposes such as enhancing the visual continuity between tiles along a marked line and other tiles.

Once the user has finished editing the mosaic description, the description is communicated to one or more computer controllers operatively associated with one or more pick-and-place robots. Such machines can be tailor-made machines and systems of machines designed for the purposes of generating a mosaic tile arrangement. Alternatively, commercially available pick-and-place machines such as those used in assembling electronic printed circuit boards can be modified for use in mosaic tile assembly according to various embodiments of this disclosure. Surface Mount Technology (SMT) machines such as used for the mounting of electronic components onto the surface of printed circuit boards, or other technologies such as through-hole electronic component mounting technologies may provide useful aspects that can be modified for use in portions of the disclosed embodiments. Such machines may offer options for mounting between about 10 to several hundred different components, or mosaic tiles of different colors, textures, sizes, shapes, or other characteristics.

FIGS. 1 and 2 are schematic illustrations of embodiments of apparatus for supplying mosaic tiles to an automated tile setter for producing a plurality of sections of underlayment on which the tiles are placed for transport to a location and installation in a mosaic tile arrangement. The process may start with an image or a picture 80, according to which a mosaic tile arrangement is to be generated. Image 80 is scanned into a computerized form by any appropriate scanner, resulting in a computerized file having any graphic format, such as JPEG, Bitmap, GIF, or the like. In various alternative embodiments, the image may be created in a computerized form or transferred earlier to a computerized form, eliminating the need for a scanning process.

Once the image is available in an electronic format, it may be processed by a controller 105 executing one or more applications or programs 110. Controller 105 may be embodied in any type of computer processing equipment, such as a personal computer, a smartphone, a laptop computer, a mainframe computer, or any other type of computing platform that is provisioned with a memory device, a CPU or microprocessor device, and several I/O ports. The processing performed by application(s) 110 may comprise a graphical user interface (GUI), so that a user can provide input relating to the image, while viewing the image or the mosaic description 115 on a display device 120, with the input optionally including guidelines within the image. The user can further view or enhance the resulting mosaic layout by performing graphic operations that may simulate actions performed on tiles when laying actual physical tiles, such as moving, rotating, deleting, adding changing or the like. Application(s) 110 may be programmed in any programming language, such as C, C#, C++, Java, VB, Python, or others, and under any development environment, such as .NET, J2EE, or the like. Alternatively, the processing can be performed in firmware ported for a specific processor such as a digital signal processor (DSP) or microcontrollers, or can be implemented as hardware or configurable hardware such as field programmable gate array (FPGA) or application specific integrated circuit (ASIC), adapted for processing images into the desired mosaic tile arrangement.

Once an execution result in the form of a mosaic tile arrangement description or layout 130 is ready and acceptable to a user, the result may be communicated to an automated mosaic tile setting machine or system 100, 200. An exemplary automated mosaic tile setting system 200, shown in FIG. 2, may include a first controller 215 operatively associated with a first pick-and-place robot 230 and a second controller 203 operatively associated with a second pick-and-place robot 214. As shown with regard to first controller 215, each controller may include one or more memories 202, one or more processors 204, and one or more command control generating modules 206 configured to generate command signals for controlling an associated pick-and-place robot 230, 214. First and second controllers 215, 203 may be communicatively coupled over a network, communication bus, or other wired or wireless communication interface with a controller such as controller 105 shown in FIG. 1, or may be configured to receive prerecorded and stored computerized control commands generated by an onsite or remote computing platform. The control commands received by first and second controllers 215, 203 may include instructions for automatically generating a plurality of sheets 228 of underlayment material covered with mosaic tiles arranged and held in place on the underlayment material such that the sections can be marked, packaged, transported, and installed at a work site to form a desired mosaic tile arrangement Various embodiments of automated mosaic tile setting system 100, 200 may include one or more pick-and-place robots or other automated placement devices that may be controlled by one or more controllers 215, 203 in accordance with a received description of a mosaic tile arrangement. In one exemplary embodiment of the disclosed apparatus, further detailed in association with FIG. 2, a surface mount technology (SMT)-type machine, such as may be used for placement of electronic components on printed circuit boards, may be modified for the placement of mosaic tiles onto various types of underlayment, such as flexible sheets of material with an adhesive applied over one surface of each sheet for retaining the tiles in position on the sheets. Modifications of SMT-type machines according to various embodiments of this disclosure may be appropriate for the task of placing tiles, due to their component supply or feeding options, picking mechanism, which may optionally use a suction end effector 212 or another mechanism appropriate for picking components having a smooth surface such as tiles, efficient algorithms for fast production, and high resolution.

A method of supplying mosaic tile to an automated mosaic tile setter, such as automated mosaic tile setting system 100, 200 shown in FIGS. 1 and 2, may include loading a variety of mosaic tiles selected from mosaic tiles of at least two different sizes, shapes, colors, textures, patterns, or other visual or tactile characteristics into a plurality of hoppers 122, 124, 126, 222, 224, 226, wherein the loading is performed under computer control. The automatic loading of the mosaic tiles into the hoppers may include assigning each respective mosaic tile of the plurality of mosaic tiles to a respective one of the hoppers, based at least in part on a proximity of the respective hopper to a location on a respective one of the plurality of sheets 228 supported on a base platform of the system where the respective mosaic tile will be placed.

In the exemplary embodiment shown in FIG. 2, the mosaic tiles may be automatically loaded into each of hoppers 222, 224, 226 from a top of each hopper on a last-in, first-out basis with the tiles in each hopper being biased in an upward direction for removal from the top of each hopper by the second pick-and-place robot 214. In other alternative embodiments, the mosaic tiles may be automatically loaded into each of the hoppers from a bottom of each hopper on a last-in, last-out basis, with the tiles in each hopper being removed from the top of each hopper by a pick-and-place robot. The automatic loading of the mosaic tiles into hoppers 222, 224, 226 in the embodiment of FIG. 2 may include assigning each respective mosaic tile of the plurality of mosaic tiles into a respective one of the plurality of hoppers based at least in part on a proximity of the respective hopper when mounted in a designated position on the automated tile setting system 200 to a location on a respective sheet 228 of underlayment material where the respective mosaic tile will be placed to form one section of an ultimate mosaic tile arrangement.

The automatic loading of the mosaic tiles into at least one of hoppers 222, 224, 226 may include loading the mosaic tiles into the at least one hopper in an order corresponding to an order in which the mosaic tiles are positioned adjacent each other on at least one portion of one of the sheets 228 of underlayment material. As a result, the process of picking each respective one of the mosaic tiles from a respective one of the hoppers and placing each respective tile on a sheet 228 of underlayment material mounted on the automated tile setting system 200 may be optimized to reduce the amount of movement and complexity of movement for the second pick-and-place robot 214 during the automated tile setting process. Various alternative embodiments of the automated mosaic tile setting system and process may include fewer or more hoppers, such as hoppers 222, 224, 226, spaced around an area where each of sheets 228 of underlayment material will be positioned on the system 200 to receive the tiles.

First pick-and-place robot 230 may be controlled by first controller 215 to pick individual tiles having particular characteristic colors, shapes, textures, etc. from sources of the tiles and then place the tiles in an optimized ordering into each of the hoppers. In alternative implementations, pre-loaded hoppers full of mosaic tiles arranged in optimized orderings may be provided to an installer and labeled according to where on automated mosaic tile setting system 200 each preloaded hopper should be placed, relative to a particular sheet 228 of underlayment material that will be receiving the tiles.

Each sheet 228 of underlayment material mounted on automated mosaic tile setting system 200 may be a flexible sheet with dimensions that are determined by the size of the system and the layout of the ultimate mosaic tile arrangement where the sections with tile will be installed. An exemplary sheet may be a flexible fiberglass sheet of material with an adhesive backing suitable for retaining the tiles that will be placed on the sheet. The order in which the mosaic tiles are loaded into hoppers 222, 224, 226 and positioned adjacent each other on at least one portion of one or more of the sheets of underlayment material may be implemented by computerized instructions included in at least one macro controlling at least one of first or second pick-and-place robots 230, 214 in order to simplify repetitive operations. The at least one macro may be repeated more than once during the loading of the mosaic tiles into hoppers 222, 224, 226 by first pick-and-place robot 230 and/or during the placement of the mosaic tiles using second pick-and-place robot 214 on one or more sheets 228 of underlayment material that will be installed at a work site to form a mosaic tile arrangement.

In various exemplary implementations of this disclosure, a scanned image to be simulated and replicated as at least a portion of the mosaic tile arrangement may be translated into a digital, pixilated copy of the scanned image using one or more of available mosaic tile colors, textures, patterns, or other characteristics as image components. Pixels in the pixilated copy of the scanned image may be resampled to at least one size that represents a size of available tiles that will be used to create the mosaic tile arrangement. The available tiles that will be used to create the mosaic tile arrangement may also determine the number, size, and locations of hoppers 222, 224, 226 and their respective positions on exemplary automated tile setting system 200 shown in FIG. 2.

In some embodiments, at least a portion of the mosaic tile arrangement at the work site may include a three-dimensional contour. At least one of the sheets of underlayment material may be a flexible sheet adapted to conform to the three-dimensional contour. In various exemplary embodiments, a three-dimensional structure may be formed using various additive and/or subtractive manufacturing techniques in order to duplicate the three-dimensional contour at the work site. For example, a three-dimensional mold or plug corresponding to at least a portion of the three-dimensional contour of the mosaic tile arrangement may be formed using at least one of additive or subtractive manufacturing techniques. In other embodiments, the three-dimensional contour may be replicated using bas-relief techniques, computer-numerically-controlled (CNC) machining techniques, injection molding techniques, or other processes. Once the three-dimensional structure has been created, respective ones of the mosaic tiles may be placed and retained on the flexible sheet, and the flexible sheet with mosaic tiles may be conformed onto an outer peripheral surface of the three-dimensional structure. Variations of pick-and-place robot 214 used to place the mosaic tiles onto the flexible sheets of underlayment material, or even directly onto three-dimensional structures may include multiple-axis machines and controllers that are capable of interpreting three-dimensional contours and automatically compensating for angular offsets between adjacent tiles as they are placed on the flexible sheets adapted to conform to various three-dimensional profiles or directly onto the three-dimensional structures.

In addition, one or more mosaic tiles may be machined by CNC equipment, based on the desired pattern of the mosaic tile arrangement. The CNC machining may be performed on the mosaic tiles at a time that is either before or after automatically loading the respective mosaic tiles into respective hoppers, or after picking the tiles from respective hoppers and before placing the tiles on the sheets of underlayment material.

The computer-controlled loading of the tiles into hoppers may include automatically loading the tiles into each of the hoppers on either a last-in, first-out basis, or a last-in, last-out basis. The automatic loading of the tiles into the hoppers may be synchronized with an optimized ordering of the tiles loaded into each hopper, based at least in part on a desired pattern of a mosaic tile arrangement being installed at a work site. In the embodiment shown in FIG. 2, each respective one of the loaded mosaic tiles may be picked from one of hoppers 222, 224, 226 using pick-and-place robot 214, including a suction or vacuum-type end effector 212.

Each respective one of the tiles picked by the robot from a respective hopper may then be placed onto a sheet 228 of flexible material with an adhesive layer adapted for retaining the tiles in a tessellated arrangement. In the exemplary embodiment of FIG. 2, a sheet 228 is supported on a base platform of the automated tile setting system 200 in a calibrated position and orientation relative to each of hoppers 222, 224, 226 containing optimized orderings of tile. In various alternative embodiments, pick-and-place robot 214 may be controlled by controller 203 to place the tiles on each sheet 228 with the proper spacing between each tile for the application of grouting material in between the tiles after installation of the tile-containing sheets 228 at a work site to form a complete mosaic tile arrangement.

Sheets 228, with adhesive material, may be configured to support and hold the mosaic tiles in their respective positions for transport to the work site where the tile-containing sheets will be installed to form the finished mosaic tile arrangement. The tiles may be placed on sheets 228 with a proper spacing from each other to leave room for the application of the grouting or other material between the tiles once they have been installed to form the mosaic tile arrangement, or in some implementations, the tiles may be placed on the sheets 228 abutting against each other with no spacing therebetween. In various alternative embodiments of this disclosure, individual sheets 228 may be manufactured using additive and/or subtractive manufacturing techniques to include clips, retainers, or other features configured to hold the individual tiles in place, with proper spacing from each other to allow for grouting material to be applied after sheets 228 are installed in their ultimate location.

The exemplary embodiment of an automated tile setting system 200 shown in FIG. 2 may be a modified SMT pick-and-place machine, similar to machines used for placing electronic components on printed circuit boards. Controller 203 and second pick-and-place robot 214 of system 200 may receive command control instructions for placing tiles on each sheet 228 from data provided to the controller 203 in various formats such as a table, a tab-delimited text file, a spreadsheet or any other format. The instructions may include designations for each tile of a tile type, shape, size, texture, or color, a location expressed in X and Y coordinates, and a rotation angle. The instructions can further comprise additional fields or data.

System 200 may be configured to retrieve individual tiles from a set of predetermined locations such as hoppers 222, 224, 226 and place the tiles in required locations and orientations on a sheet 228 of underlayment material, supported by a base platform of system 200. In some implementations, each tile type may be collected from one or more predetermined locations. Multiple tiles of each type may be collected from one location, but two or more locations may supply tiles of the same type, for example when there is a dominant tile type in the mosaic. The exemplary embodiment of system 200 includes end effector 212 as part of second pick-and-place robot 214. End effector 212 may include one or more holding elements, such as a vacuum nipple or another mechanism for lifting and transferring tiles.

Second pick-and-place robot 214 may move in the X and Y directions, and end effector 212 may further move in the Z direction. Movement in the X direction, as shown by arrow 215, is enabled by pick-and-place robot 214 sliding along rails 220. Movement in the Y direction, as shown by arrow 235, is enabled by robot 214, rails 220, and carriages 230 and 230' sliding along rails 240 and 240' respectively. Movement in the Z direction, as shown by arrow 225, is enabled by end effector 212 slidably connected to move up into the robot 214 and extend downward out of robot 214. End effector 212 may also rotate around a central axis to provide an additional degree of freedom in manipulating the position of a tile being placed by robot 214 in any required orientation on a sheet 228.

The movements of second pick-and-place robot 214 may be controlled by controller 203, which may include one or more processors, field-programmable gate arrays (FPGAs), or application-specific integrated circuits (ASICs), adapted for planning and controlling the movements of second pick-and-place robot 214. Second pick-and-place robot 214 is thus manipulated to take hold, pick, or grab a tile from one of hoppers 222, 224, 226, lift the tile to a predetermined height, convey the tile by moving robot 214 in the X and Y directions, and then lower the tile, rotate the tile if necessary to orient the tile properly, and place the tile at a required location on sheet 228.

It will be appreciated that a pick-and-place robot according to various embodiments of this disclosure is not limited to picking and placing tiles of a single size and shape. Thus, if a mosaic description comprises tiles of different shapes and sizes, then such tiles can be used by the system. Moreover, although an exemplary embodiment of a SMT machine is shown in the figures, any other type of pick-and-place robot capable of being programmed to pick individual tiles from each of a plurality of different locations and place the tiles on a sheet of underlayment material to form a section of a mosaic tile arrangement may be employed. First pick-and-place robot 230 may also be any type of pick-and-place robot capable of being programmed to pick individual tiles from each of a plurality of sources of tile and place the tiles in an optimized ordering, as discussed above, into each of a plurality of hoppers such as hoppers 222, 224, 226 in the exemplary embodiment of FIG. 2.

FIG. 3 is a flowchart showing an exemplary method 300 of operating the above-described automated system for supplying tile to an automated tile setter. At Step 310, a first pick-and-place robot such as pick-and-place robot 230 in FIG. 2, may pick mosaic tiles from various sources of the tiles. In an exemplary embodiment, the source of tiles may be a plurality of bins that each respectively contain a plurality of tile pieces of the same color, shape, size, texture, or other characteristics, with tile pieces having different characteristics being stored in separate bins.

First pick-and-place robot 230 may be configured to pick each tile having particular characteristics from a respective bin and place the tile into the proper hopper 222, 224, 226. This operation may be based on an optimized ordering determined for a particular mosaic tile arrangement and for a particular section of the mosaic tile arrangement being prepared by the automated tile setting system 200. At Step 320, first pick-and-place robot 230 places each of the mosaic tiles picked from an associated bin into a respective one of hoppers 222, 224, 226 in an optimized ordering. The optimized orderings of tiles in the hoppers may be a function of the order in which tiles from each respective hopper will be picked from the respective hopper and placed along a predetermined path on a particular sheet 228, to form a particular section of the mosaic tile arrangement. At Step 330, a controller controls operation of first pick-and-place robot 230 such that each tile is assigned to a hopper based at least in part on the proximity of the respective hopper to the specific location on a sheet of underlayment material where the respective tile will be placed. As shown at Step 340, the assignment of respective tiles into respective hoppers may also be based on one of a last-in, first-out basis or a last-in, last-out basis.

At Step 350, tiles may be picked from respective hoppers using a second pick-and-place robot, such as robot 214 shown in FIG. 2. At Step 360, second pick-and-place robot 214 may place each tile on a sheet of underlayment material that will form a section of a final mosaic tile arrangement, once the sheet has been transported to the ultimate destination and installed as part of the final mosaic tile arrangement. As shown at Step 370 in FIG. 3, an exemplary implementation may include marking each separate sheet 228 of underlayment material with identification markings, such as a grid location, according to where the sheet with installed tiles will be placed at the ultimate destination to form the final mosaic tile arrangement.

The disclosed methods and apparatus provide a process for designing, creating and installing mosaics from a given image. A user is offered the option to edit the mosaic description using a variety of graphic options, including adding, deleting, changing the color, moving or rotating one or more tiles, including rotating a group of tiles to any desired angle, orienting the tiles as required to conform to different two and three dimensional configurations, and leaving desired spacings between the tiles for grouting or other material to be applied after the tiles have been installed at their ultimate destination. The mosaic layout is preferably presented to a user in a realistic way by displaying scanned images of tiles of the relevant colors, rather than a computer-generated shape for each presented tile. The description may then be transferred to at least one pick-and-place machine and associated controller such that tiles may be loaded in optimized orderings into a plurality of hoppers. The hoppers, either loaded with tiles in optimized orderings on-site or preloaded off-site, may then be associated with another pick-and-place machine adapted to place the tiles onto sheets of underlayment material to form sections of the mosaic tile arrangement. The presented methods and apparatus enable automated, reproducible, accurate, and rapid production of highly artistic and customizable mosaic tile arrangements without the requirement for any special artistic abilities or mosaic tile laying skills, thus yielding high throughput, scalability, and reduced manufacturing and installation costs when producing mosaic tile arrangements for different settings.

A person skilled in the art will appreciate that multiple options and modifications exist to the disclosed methods and apparatus. It will be appreciated that the disclosed methods and apparatus are not limited to tiles of particular visual or tactile characteristics or to placement of the tiles in a two dimensional configuration. Rather, tiles of multiple sizes, shapes, and other characteristics can be used for constructing mosaic tile arrangements to be installed over two dimensional or three dimensional surfaces according to the disclosed methods and apparatus.

The elements in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit being indicated by the following claims and their full scope of equivalents.

What is claimed is:

1. A method of supplying mosaic tile to an automated mosaic tile setter, the method comprising:
automatically loading a plurality of mosaic tiles, selected from mosaic tiles of at least two different characteristics, into a plurality of hoppers, the automatic loading comprising controlling a first pick-and-place robot to pick the mosaic tiles from a source of the mosaic tiles and place the mosaic tiles into the hoppers, based on:
one of a last-in, first-out basis, or a last-in, last-out basis; and
a desired pattern of a mosaic tile arrangement for installation at a work site;
picking the loaded mosaic tiles from the hoppers using a second pick-and-place robot; and
placing the picked mosaic tiles onto sheets of underlayment material in a tessellated arrangement, the sheets being configured to support and hold the respective mosaic tiles in predetermined positions relative to each other.

2. The method of claim 1 wherein automatic loading of the mosaic tiles comprises assigning respective ones of the mosaic tiles into respective ones of the hoppers, based at least in part on proximities of the hoppers to locations on the sheets where the respective mosaic tiles will be placed.

3. The method of claim 1 wherein automatic loading the mosaic tiles comprises automatically loading the mosaic tiles into the hoppers from tops of the hoppers on a last-in, first-out basis, with the tiles in the hoppers being biased in an upward direction for removal from the tops of hoppers by the second pick-and-place robot.

4. The method of claim 1, wherein automatic loading of the mosaic tiles comprises automatically loading the mosaic tiles into the hoppers from bottoms of the hoppers on a last-in, last-out basis, with the tiles in the hoppers being removed from the tops of the hoppers by the second pick-and-place robot.

5. The method of claim 1, wherein automatic loading of the mosaic tiles comprises automatically loading the mosaic tiles into the hoppers in orders corresponding to orders in which the mosaic tiles are positioned adjacent each other on at least portions of the sheets.

6. The method of claim 5, wherein:
the order in which the mosaic tiles are loaded and positioned is implemented by computerized macro instructions controlling at least one of the first or second pick-and-place robots; and
the computerized macro instructions are repeated during the loading and the placement of the mosaic tiles on the sheets.

7. The method of claim 1, further comprising translating a scanned image of at least a portion of the mosaic tile arrangement into a digital, pixilated copy of the scanned image using characteristics of available mosaic tiles as image components.

8. The method of claim 7, further comprising resampling pixels in the copy of the scanned image to a size that represents a size of available tiles in the mosaic tile arrangement.

9. The method of claim 1, wherein:
at least a portion of the mosaic tile arrangement comprises a three-dimensional contour and the sheets of underlayment material comprise flexible sheets adapted to conform to the three-dimensional contour; and
the method further comprises:
forming a three-dimensional plug corresponding to at least a portion of the three-dimensional contour using at least one of additive or subtractive manufacturing techniques;
placing and retaining the mosaic tiles on the flexible sheets; and
conforming the flexible sheets with the mosaic tiles onto an outer peripheral surface of the three-dimensional plug.

10. The method of claim 1, further comprising computer-numerically-controlled (CNC) machining of one or more of the mosaic tiles based on the desired pattern of the mosaic tile arrangement, wherein the CNC machining being performed on the mosaic tiles at a time that is one of:
before loading the mosaic tiles into the hoppers; or
after picking the mosaic tiles from the plurality of hoppers and before placing the mosaic tiles on the sheets.

11. A system for supplying mosaic tiles to an automated mosaic tile setter, the system comprising:
a first pick-and-place robot configured for loading mosaic tiles into hoppers, the mosaic tiles comprising a plurality of characteristics;
a first controller operatively connected to the first pick-and-place robot and programmed to control the first pick-and-place robot to:
automatically load the mosaic tiles into the hoppers on one of a last-in, first-out basis, or a last-in, last-out basis; and
synchronize the automatic loading with an optimized ordering of the mosaic tiles, based on a desired pattern of a mosaic tile arrangement;
a second pick-and-place robot configured to pick and place the loaded mosaic tiles from the hoppers; and
a second controller operatively connected to the second pick-and-place robot and programmed to control the second pick-and-place robot to:
pick the mosaic tiles from the hoppers; and
place the mosaic tiles onto sheets of underlayment material in arrangements that form sections of the mosaic tile arrangement.

12. The system of claim 11, wherein the first controller is further programmed to control the first pick-and-place robot to automatically load the mosaic tiles into each of the plurality of hoppers by assigning each respective mosaic tile into a respective one of the plurality of hoppers based at least in part on a proximity of the respective hopper to a location on a respective one of the plurality of sheets where the respective mosaic tile will be placed.

13. The system of claim 11 wherein the first controller is further programmed to control the first pick-and-place robot to automatically load the mosaic tiles into each of the plurality of hoppers from a top of each respective hopper on a last-in, first-out basis with the tiles in each respective hopper being biased in an upward direction for removal from the top of the respective hopper by the second pick-and-place robot.

14. The system of claim 11, wherein the first controller is further programmed to control the first pick-and-place robot to automatically load the mosaic tiles into each of the plurality of hoppers from a bottom of each respective hopper on a last-in, last-out basis with the tiles in each respective hopper being removed from the top of the respective hopper by the second pick-and-place robot.

15. The system of claim 11, wherein the first controller is further programmed to control the first pick-and-place robot to automatically load respective ones of the mosaic tiles into at least one of the plurality of hoppers in an order corresponding to an order in which the respective ones of the mosaic tiles are placed adjacent each other on at least one portion of one of the plurality of sheets of underlayment material.

16. The system of claim 15, wherein at least one of the first controller or the second controller is further programmed with one or more macros that comprise executable computer instructions to control the respective first or second pick-and-place robot such that at least one of the order in which a set of the mosaic tiles are loaded into the at least one hopper by the first pick-and-place robot or positioned adjacent each other on at least one portion of one of the sheets of underlayment material by the second pick-and-place robot can be repeated by execution of the one or more macros.

17. The system of claim 11, wherein at least one of the first controller or the second controller is further programmed to translate a scanned image to be simulated as at least a portion of the mosaic tile arrangement into a digital, pixilated copy of the scanned image using one or more of available mosaic tile colors, textures, patterns, or other characteristics as image components.

18. The system of claim 17, wherein the at least one of the first controller or the second controller is further programmed to resample pixels in the pixilated copy of the scanned image to at least one size that represents a size of available tiles that will be used to create the mosaic tile arrangement.

19. The system of claim 11, wherein at least a portion of the mosaic tile arrangement to be installed at the work site includes a three dimensional contour, the system further comprising at least one of an additive or subtractive manufacturing device configured to manufacture a three dimensional plug corresponding to at least a portion of the three dimensional contour of the mosaic tile arrangement, and the second pick-and-place robot being configured to place respective ones of the mosaic tiles on at least one flexible sheet of underlayment material adapted to conform to an outer peripheral surface of the three dimensional plug.

20. A method of supplying mosaic tile to an automated mosaic tile setter, the method comprising:
automatically loading a variety of mosaic tiles selected from mosaic tiles of at least two different colors, textures, patterns, or other visual or tactile characteristics into a plurality of hoppers, wherein the automatic loading comprises:
controlling a first pick-and-place robot to pick each of the mosaic tiles from a source of the mosaic tiles and place each respective mosaic tile into a respective one of the plurality of hoppers based on:
one of a last-in, first-out basis, or a last-in, last-out basis; and
a desired pattern of a mosaic tile arrangement for installation at a work site;
picking each respective one of the loaded mosaic tiles from each of the plurality of hoppers using a second pick-and-place robot;
computer-numerically-controlled (CNC) machining one or more of the respective mosaic tiles picked from a respective one of the hoppers based on the desired pattern of the mosaic tile arrangement before placing the respective mosaic tiles on one of a plurality of sheets of underlayment material; and
placing each respective one of the mosaic tiles picked by the second pick-and-place robot onto one of the plurality of sheets of underlayment material in a tessellated arrangement, wherein each of the plurality of sheets is configured to support and hold the respective mosaic tiles in respective positions relative to each other for transport to the work site and installation to form the mosaic tile arrangement.

* * * * *